United States Patent
Cardinal et al.

(10) Patent No.: US 9,822,766 B2
(45) Date of Patent: Nov. 21, 2017

(54) METHOD FOR OPERATING A WIND FARM AND WIND FARM

(71) Applicant: General Electric Company, Schenectady, NY (US)

(72) Inventors: Mark Edward Cardinal, Altamont, NY (US); Kuruvilla Pallathusseril Kuruvilla, Lake Mary, FL (US); Enno Ubben, Steinfurt (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 721 days.

(21) Appl. No.: 14/170,678

(22) Filed: Feb. 3, 2014

(65) Prior Publication Data
US 2015/0219075 A1    Aug. 6, 2015

(51) Int. Cl.
*F03D 9/00* (2016.01)
*F03D 7/02* (2006.01)
(Continued)

(52) U.S. Cl.
CPC .............. *F03D 9/005* (2013.01); *F03D 7/00* (2013.01); *F03D 7/028* (2013.01); *F03D 7/048* (2013.01); *F03D 9/257* (2017.02); *Y02E 10/723* (2013.01)

(58) Field of Classification Search
CPC . F03D 9/005; F03D 7/00; F03D 7/048; F03D 7/028
See application file for complete search history.

(56) References Cited

U.S. PATENT DOCUMENTS

| | | | |
|---|---|---|---|
| 2007/0124025 A1* | 5/2007 | Schram | F03D 7/0224 700/287 |
| 2011/0140428 A1 | 6/2011 | Wakata et al. | |

FOREIGN PATENT DOCUMENTS

| | | |
|---|---|---|
| EP | 1790851 A2 | 5/2007 |
| EP | 2093420 A2 | 8/2009 |
| EP | 2679812 A1 | 1/2014 |

OTHER PUBLICATIONS

European Search Report and Written Opinion issued in connection with corresponding EP Application No. 15153574.7 dated Jul. 7, 2015.

* cited by examiner

*Primary Examiner* — Moshe Wilensky
(74) *Attorney, Agent, or Firm* — Douglas D. Zhang; GE Global Patent Operation (57) ABSTRACT

A method for operating a wind farm is provided. The wind farm includes at least two groups of wind turbines, each of the at least two groups of wind turbines includes at least one wind turbine of the wind farm, each of the wind turbines of the wind farm belonging to one of the at least two groups of wind turbines. The method includes determining a power setpoint for the wind farm, determining a group curtailment setpoint for each of at least two groups of wind turbines, determining a power production value of each of the at least two groups of wind turbines, determining for each of the at least two groups of wind turbines a power reference value using the respective group curtailment setpoint and the respective power production value, determine for each of the at least two groups of wind turbines a group power setpoint which is proportional to the respective power reference values, and operating the at least two groups of wind turbines in accordance with the respective group power setpoint. Furthermore, a wind farm is provided.

10 Claims, 7 Drawing Sheets

(51) Int. Cl.
*F03D 7/04* (2006.01)
*F03D 7/00* (2006.01)
*F03D 9/25* (2016.01)

METHOD FOR OPERATING A WIND FARM AND WIND FARM

BACKGROUND OF THE INVENTION

The subject matter described herein relates generally to wind farms and methods for operating the wind farms, and more particularly, to methods for curtailing the wind farms.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Often, several or a plurality of wind turbines form a wind farm in which the total produced power of the wind turbines is controlled by a supervisory or subordinate control system of the wind farm. Modern wind farms may have a very high installed electrical power, in particular if the wind farm is positioned at locations offering particularly good wind yields, such as at the coast or off-shore, and/or if the wind farm includes a larger number of modern wind turbine. The connection of high power wind farms to a grid may pose challenges regarding grid quality, in particular if the percentage of the power fed by wind farms into the utility grid increases. In this respect, energy suppliers and energy traders, respectively, may require an appropriate behavior of the wind farms in particular during an instability of the grid, e.g. a frequency shift, and/or an excess supply in the grid.

It would therefore be desirable to provide systems and methods allowing for flexible and reliable curtailment of wind farms.

BRIEF DESCRIPTION OF THE INVENTION

In one aspect, a method for operating a wind farm is provided. The wind farm includes at least two groups of wind turbines each of which includes at least one wind turbine of the wind farm. The method includes determining a power setpoint for the wind farm, determining a group curtailment setpoint for each of the at least two groups of wind turbines, determining a power production value of each of the at least two groups of wind turbines, determining for each of the at least two groups of wind turbines a power reference value using the respective group curtailment setpoint and the respective power production value, determine for each of the at least two groups of wind turbines a group power setpoint which is proportional to the respective power reference values, and operating the at least two groups of wind turbines in accordance with the respective group power setpoint.

In another aspect, a method for curtailing a wind farm is provided. The method includes dividing the wind farm into at least two groups of wind turbines so that each of the at least two groups of wind turbines comprises at least one wind turbine of the wind farm, and that each of the wind turbines of the wind farm belongs to one of the at least two groups of wind turbines, receiving a power reduction request for the wind farm which is lower than a rated power of the wind farm, receiving a set of curtailment setpoints including a group curtailment setpoint for each of the at least two groups of wind turbines, determining an updated set of curtailment setpoints including relaxing at least one of the group curtailment setpoints to allow an overproduction of at least one of the at least two groups of wind turbines, using the updated set of curtailment setpoints for determining for each of the at least two groups of wind turbines a group power setpoint such that a sum of the group power setpoints substantially matches the power setpoint, and operating the at least two groups of wind turbines in accordance with the respective group power setpoint.

In yet another aspect, a wind farm is provided. The wind farm includes at least two groups of wind turbines and a wind farm control system including a group reference system. Each of the at least two groups of wind turbines includes at least one wind turbine having a rotor comprising a rotor axis, and a generator connected to the rotor. Each of the wind turbines of the wind farm belongs to one of the at least two groups of wind turbines. The wind farm control system includes a group reference system which is configured to receive a power setpoint for the wind farm, a group curtailment setpoint for each of at least two groups of wind turbines, and a power production value of each of the at least two groups of wind turbines, to determine for each of the at least two groups of wind turbines a power reference value using the respective group curtailment setpoint and the respective power production value, and to determine for each of the at least two groups of wind turbines a group power setpoint which is proportional to the respective power reference values.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind farm and a method for coordinated operating the wind farm and groups of wind turbines of the wind farm taking into account a power reduction request for the wind farm. Accordingly, different power demands based on the request of the energy traders may be managed while the overall power output of the wind farm is controlled such that the utility grid may be stabilized, for example in the event of a frequency drop of the utility grid, or during a required reduction of the overall power output. Further, the groups may be prioritized.

As used herein, the term "blade" is intended to be representative of any device that provides a reactive force when in motion relative to a surrounding fluid.

As used herein, the term "wind turbine" is intended to be representative of any device that generates rotational energy from wind energy, and more specifically, converts kinetic energy of wind into mechanical energy. The term "wind turbine" as used herein shall particularly embrace devices that generate electrical power from rotational energy generated from wind energy.

As used herein, the term "normal operation" intends to describe an operating mode of the wind turbine in which kinetic energy of wind is converted to electrical power.

As used herein, the term "wind farm" is intended to be representative of any system including two or more wind turbines and a wind farm control system adapted to control the overall power output generated by the two or more wind turbines at a connection point, typically a connection point to a power grid or a substation. The wind farm control system is typically a separate unit but may also be a part of one of the wind turbines or even distributed over several wind turbines.

As used herein, the terms "group of wind turbines" and "wind turbine group" are intended to represent any subset of wind turbines of a wind farm, i.e. one or more wind turbines of the wind farm.

Figure 1:
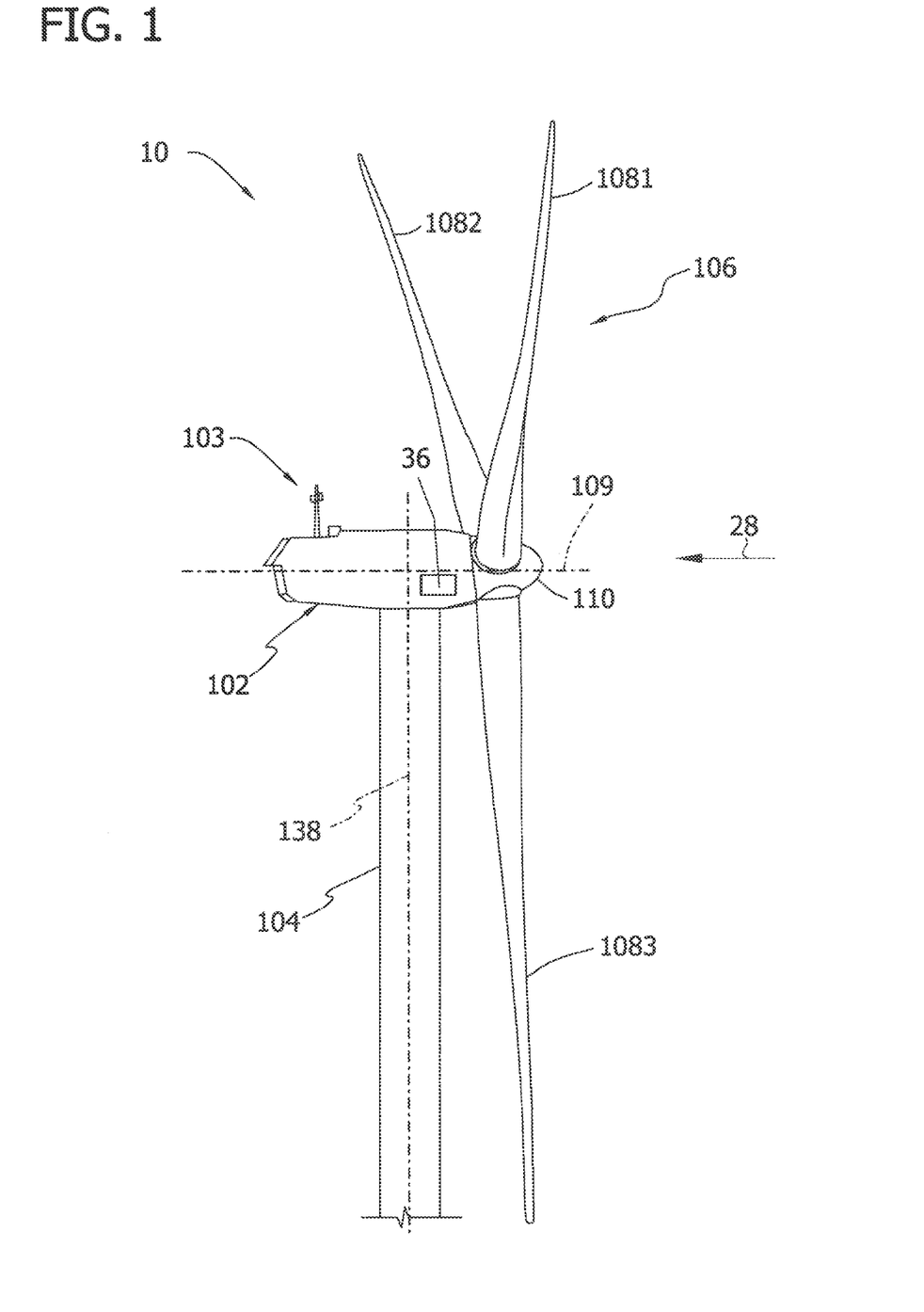
FIG. 1 is a perspective view of a portion of an exemplary wind turbine.

FIG. 1 is a perspective view of a portion of an exemplary wind turbine 10. Wind turbine 10 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 1081, 1082, 1083 attached to a rotating hub 110. Alternatively, wind turbine 100 includes any number of blades that facilitates operation of wind turbine 100 as described herein. In the following a rotor with one or more rotor blades is also referred to as a wind rotor. In the exemplary embodiment, wind turbine 10 includes a gearbox (not shown in FIG. 1) operatively coupled to rotor 106 and a generator (not shown in FIG. 1).

In one embodiment, rotor blades 1081, 1082, 1083 have a length ranging from about 15 meters (m) to about 91 m. Alternatively, rotor blades 1081, 1082, 1083 may have any suitable length that enables wind turbine 10 to function as described herein. For example, other non-limiting examples of blade lengths include 10 m or less, 20 m, 37 m, or a length that is greater than 91 m. As wind strikes rotor blades 1081, 1082, 1083 from a direction 28, rotor 106 is rotated about an axis of rotation 109. As rotor blades 1081, 1082, 1083 are rotated and subjected to centrifugal forces, rotor blades 1081, 1082, 1083 are also subjected to various forces and moments. As such, rotor blades 1081, 1082, 1083 may deflect and/or rotate from a neutral, or non-deflected, position to a deflected position.

Moreover, a pitch angle or blade pitch of rotor blades 1081, 1082, 1083, i.e., an angle that determines a perspective of rotor blades 1081, 1082, 1083 with respect to direction 28 of the wind, may be changed by a pitch adjustment system to control the load and power generated by wind turbine 10 by adjusting an angular position of at least one rotor blade 1081, 1082, 1083 relative to wind vectors.

Nacelle 102 also includes a yaw drive mechanism that may be used to rotate nacelle 102 on a yaw axis 138 to control the perspective of rotor blades 1081, 1082, 1083 and rotor 106, respectively, with respect to local wind direction 28.

Nacelle 102 typically also includes at least one meteorological mast 113 that includes a wind vane and anemometer (neither shown in FIG. 1). Mast 113 provides information such as wind direction and wind speed to a turbine controller 36 for controlling the generator, the pitch adjustment system and/or the yaw drive mechanism.

Figure 2:
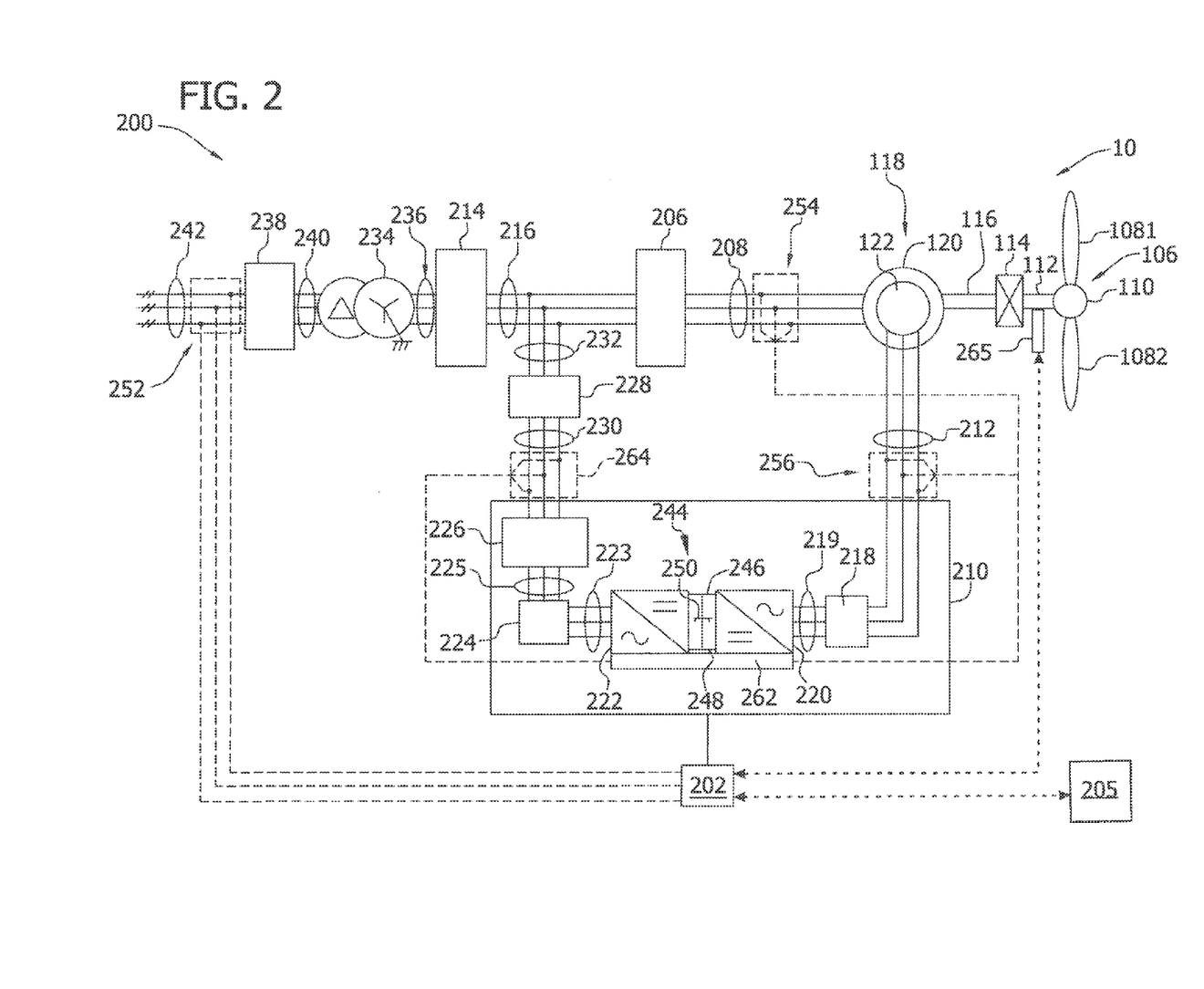
FIG. 2 is a schematic view of an exemplary electrical and control system suitable for use with the wind turbine shown in FIG. 1.

FIG. 2 is a schematic view of an exemplary electrical and control system 200 that may be used with wind turbine 10. Rotor 106 includes blades 1081, 1082 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 10 as described herein. As a further alternative, wind turbine 10 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 10. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 1081, 1082 and blades 1081, 1082 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. In the exemplary embodiment, an encoder 265 connected to low-speed shaft 112 or high speed shaft 116 may be used to measure a rotational speed and/or an angular position of the respective shaft and rotor 106, respectively.

High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 1081, 1082. Therefore, in this manner, mechanical and electrical rotor frequencies are decoupled from stator frequency. Accordingly, generator 118 is a variable speed generator.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 10 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

In the exemplary embodiment, turbine controller 202 is connected with a wind farm control system 205 operating as a supervisory control for the turbine controller 202. This is explained in more detail with regard to FIG. 3.

Figure 3:
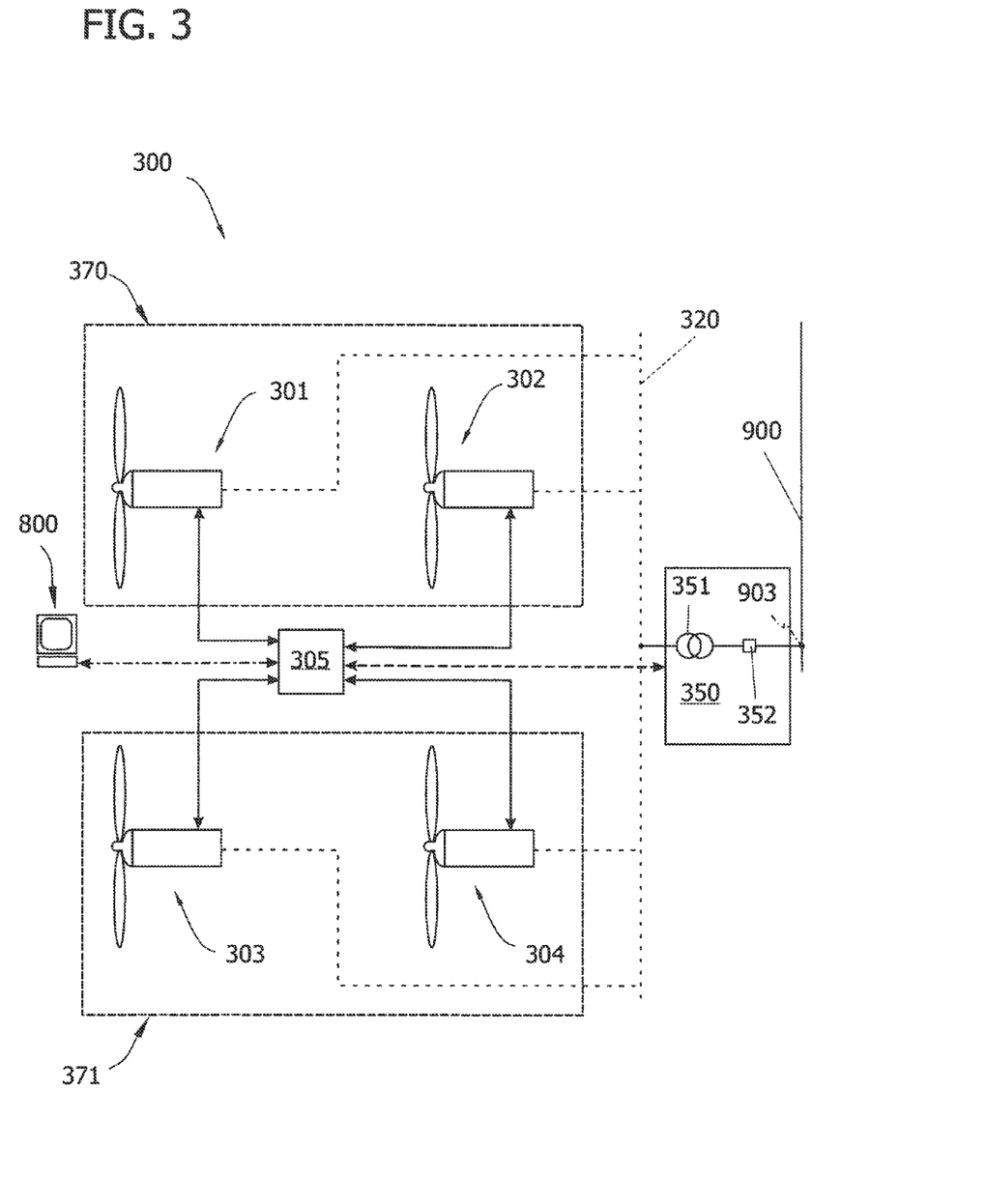
FIG. 3 is a schematic view of a wind farm according to an embodiment.

In FIG. 3 a schematic illustration of a wind farm 300 is shown. In the exemplary embodiment, four wind turbines 301 to 304 which may be similar as explained above with regard to FIG. 1 and FIG. 2 are connected via an internal grid 320 with a transformer substation 350. Note that FIG. 3 shows, for sake of simplicity, only four wind turbines 301-304. Large wind farms can have more than hundred wind turbines controlled by one central controller 305 which is typically located in a separate substation but may also be part of one of the wind turbines. As explained above, the wind farm control system 305 may be centralized or distributed over the wind turbines.

The power produced by wind turbines 301 to 304 may be stepped up in voltage by turbine transformers (not shown) before being coupled to the internal grid 320. The internal grid 320 is typically a medium voltage, three-phase alternating current (ac) network operating e.g. at a few kV up to a few 10 kV and 50 Hz or 60 Hz. A station transformer 351 of the transformer substation 350 is typically used to step up voltage from the internal grid voltage to a required transmission voltage of the external, main or utility grid 900 to which the transformer substation 400 can be connected at the point-of-common-coupling (PCC) 903 using a suitable power switch 352. Further, the internal grid 320 may power a central controller 305 and/or the wind turbines 301 to 304.

In an ac electric system the current, I, and the voltage, V, can be out of phase. Consequently, the product of current and voltage $S=I*V$ can be complex. In the context of this application, the term power shall embrace, the complex power, the active or real power $P=Re(S)$, i.e. to the energy that is transferred per unit of time and the imaginary part of S referred to as reactive power $Q=Im(S)$. Likewise, the tem "power setpoint" shall embrace setpoints for complex power, active power and reactive power that may be issued to wind turbine controllers as setpoints for controlling the power production of the respective wind turbine.

The central controller 305 is arranged for communication with the wind turbines 301 to 304 via communication links (full arrows), which may be implemented in hardware and/or software. Typically, the communication links 550 are realized as an Ethernet LAN which will also enable remote control using a SCADA (Supervisory, Control and Data Acquisition) computer 800. However, the communication links (arrows) may also be configured to remotely communicate data signals to and from the central controller 305 in accordance with any fiber optic, wired or wireless communication network known to one skilled in the art. Such data signals may include, for example, signals indicative of operating conditions of individual wind turbine which are transmitted to the central controller 305 and various command signals communicated by the central controller 305 to the wind turbines 301 to 304 to supervise the power production of the wind turbines 301 to 304. Note, that the full and dashed-dotted arrows in FIG. 3 only indicate that there are links between the central controller 305 and the other devices. They do not necessarily reflect the topology of the used communication links.

Further, the central controller 305 is typically operable to control the power switch 352 and/or various switching devices or actuators (not shown), such as feeders, power switches, capacitors and reactors via additional communication links (not shown), for example a CAN (Controller Area Network)—bus, to control e.g. frequency, active and reactive power output of the wind farm 300.

In other words, the central controller 305 is operable as a wind farm control system and wind farm controller, respectively, and typically performs a closed loop control or regulation such that the wind farm 300 produces active and reactive power according to given request or global set points of the wind farm 10. It should be understood, that the term "control" can also refer to "regulate" or "regulation".

In a conventional control mode, the central controller 305 may read the actual reactive power and actual (real or active) power at the PCC 903, compare the measured values with the global set points and issue power and VAR (voltage-ampere-reactive) commands or set points to each wind turbine 301-302 on any deviation. This effectively makes the wind farm 300 acts as a single power production unit instead of individual wind turbines 100-102.

In the exemplary embodiment, the wind farm 300 is divided into two groups 370, 371 each of which has two wind turbines, may belong to a different owner s and/or may be under contract with different energy traders. This is however only an example. The wind farm 300 may have more than two groups of wind turbines and each group of wind turbines may have one or more wind turbines, for example more than five or more than about 10 wind turbines. Further, the number of wind turbines may be different for different groups of wind turbines. Even further, the allocation (clustering) of the wind turbines to the groups of wind turbines, which are in the following also referred to as wind turbine groups, may change during operation of the wind farm, e.g. due to a change of ownership or change of delivery contracts.

According to an embodiment, the central controller 305 is operable to control the power production of wind turbine groups 370, 371 and the wind farm 300 individually in a group control mode. For this purpose the central controller 305 typically includes wind farm power regulator configured to generate a wind farm power reference value (power setpoint) in accordance with an external power request as explained below with regards to FIG. 6, and a group reference system as explained below with regards to FIG. 4 and FIG. 5 for distributing the wind farm power reference to the individual wind turbine groups 370, 371 as group power setpoint.

Figure 4:
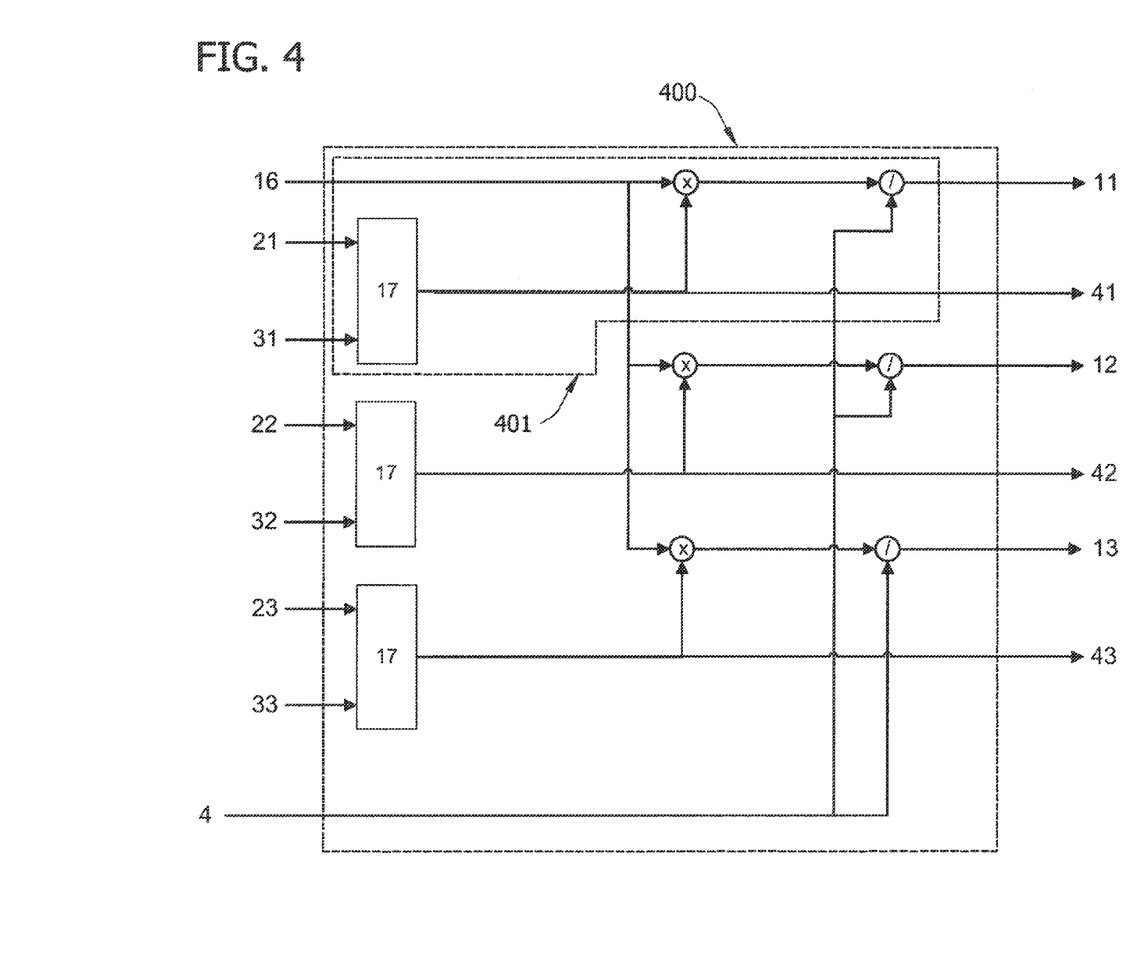
FIG. 4 is a block diagram of a group reference system according to an embodiment.

FIG. 4 shows a block diagram of a group reference system 400 that may be used by a wind farm control system to determine group power setpoints $1i$ for each of the wind turbine groups i (i=1 ... N, with N>2). In the exemplary embodiment, the number N of wind turbine groups is chosen to be three (N=3). Accordingly, three group power setpoints 11, 12 and 13 are to be determined and output at respective outputs.

The group reference system 400 receive as inputs a power setpoint 16 for the wind farm, group curtailment setpoints $2i$ (21, 22, 23 in the exemplary embodiment) for each of the wind turbine groups i (1 2, 3 in the exemplary embodiment) and power production values $3i$ (31, 32, 33 in the exemplary embodiment) for each of the wind turbine groups i.

The power production values 3*i* and the group curtailment setpoints 2*i* both typically range from zero to a rated power of the wind turbine group i but may also be given in relative units, e.g. in terms of the rated power of the wind turbine group i.

If no external curtailment requirement is set for one or more wind turbine group i, the wind farm control system typically issues the power production value 3*i* to the corresponding curtailment setpoint 2*i* input of the group reference system 400.

The power production values 3*i* may correspond to actual overall power productions of the wind turbines in the respective group (measured values or sum of power setpoints valid at the time). More typically, the power production values $P_{PGi}$ correspond to possible power productions, typically to maximum power that may be produced or is expected to be producible at the time (given wind condition) by the wind turbines of the respective wind turbine group i.

For each of the wind turbine groups i, a power reference value 4*i* (41, 42, 43 in the exemplary embodiment, in the following also referred to as group power reference value) is determined from the respective group curtailment setpoint 2*i* and the respective power production value 3*i*, typically as a minimum of the values as illustrated in FIG. 4 by the minimum calculating blocks 17. Further, the power reference values 4*i* are typically output at respective outputs.

The power reference values 4*i* are multiplied with power setpoint 16 and divided by a sum 4 of the power reference values 4*i* to determine the group power setpoints 1*i* (11, 12, 13 in the exemplary embodiment). The sum 4 of the power reference values 4*i* may be determined by the group reference system 400 or externally and used as input value in a next iteration cycle. For safety reasons, the dividers of group reference system 400 are typically implemented as protected dividers returning zero if the divisor is zero.

In so doing, group power setpoints 1*i* are calculated for each of the wind turbine groups i which are proportional to the respective power reference value 4*i*. As the power reference values 4*i* are determined as function of the respective power production value 3*i* and group curtailment setpoint 2*i*, the requested power of the wind farm (power setpoint 1) may be shared in accordance with group specific curtailment setpoints 2*i*. This increases flexibility of wind farm operation, in particular when the (active) power production of the wind farm is to be reduced.

Note that group reference system 400 may also be used for controlling a wind farm if only a few or even none external group curtailment requirements are set.

Figure 5:
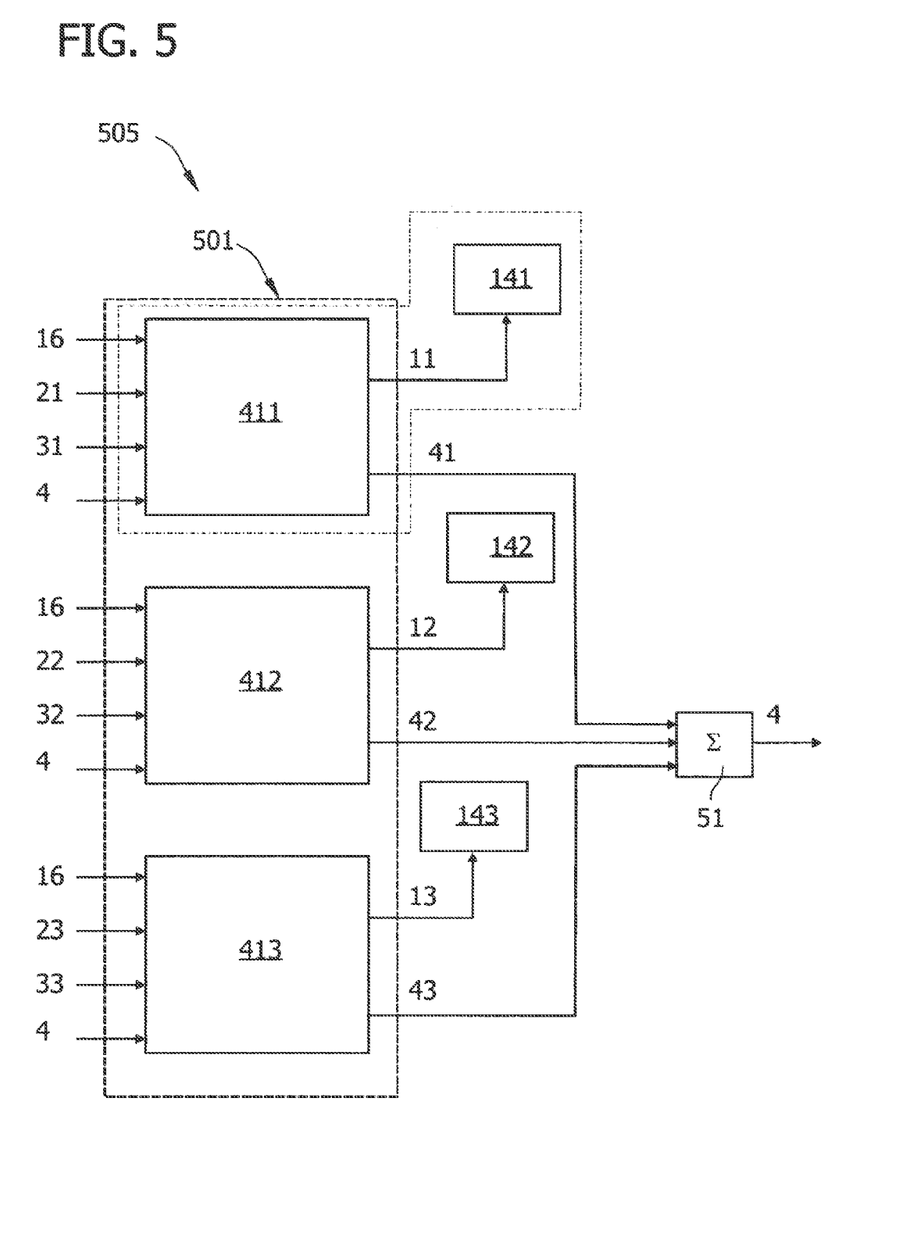
FIG. 5 is a block diagram of a wind farm control system according to an embodiment.

FIG. 5 shows a block diagram of a wind farm control system 505. In the exemplary embodiment, wind farm control system 505 controls three wind turbine groups (not shown in FIG. 5). Wind farm control system 505 includes a group reference system 501 which is similar to the group reference system 400 explained above with regard to FIG. 4. However, the topology of the group reference system 501 is different and includes for each wind turbine group i a separate subunit 41*i* (411, 412, 413 in the exemplary embodiment) for calculating and issuing the group power setpoints 1*i* (11, 12, 13 in the exemplary embodiment) to a corresponding group power distributing unit 14*i* (141, 142, 143 in the exemplary embodiment) configured to determine and issue from the respective group power setpoints 1*i* individual power setpoints for the wind turbines of the respective wind turbine group so that the sum of the power setpoints matches the respective group power setpoint 1*i*. Typically, group power distributing units 14*i* are implemented as regulator units configured to close-loop control the power output of the respective wind turbine group. The group power distributing units 14*i* are therefore also referred to as group power regulator units.

Each of the subunits 41*i* has four inputs (for the power setpoint 16, the sum of the power reference values 4, and for the group specific power production value 3*i* and curtailment setpoint 2*i*) and two outputs for the group specific power reference value 4*i* and group specific power setpoint 1*i*.

Each of the subunits 41*i* may operate as a subset of the group reference system 400 explained above with regard to FIG. 4. For example, subunits 411 of group reference system 501 may correspond to the subset 401 of the group reference system 400.

In the exemplary embodiment, wind farm control system 505 further includes a summing unit 51 for calculating the sum 4 of the power reference values 4*i* which may be used as input value for the group reference system 501 in the next cycle. During initialization the sum 4 of the power reference values 4*i* may be assigned with zero. Due to using protected dividers, the subunits 41*i* will, in a first initialization cycle, return zeros as group power setpoints 1*i* but a positive power reference value 4*i* for the wind turbine groups i capable to generate electric power. This will result in a positive sum 4 in the next cycle.

Figure 6:
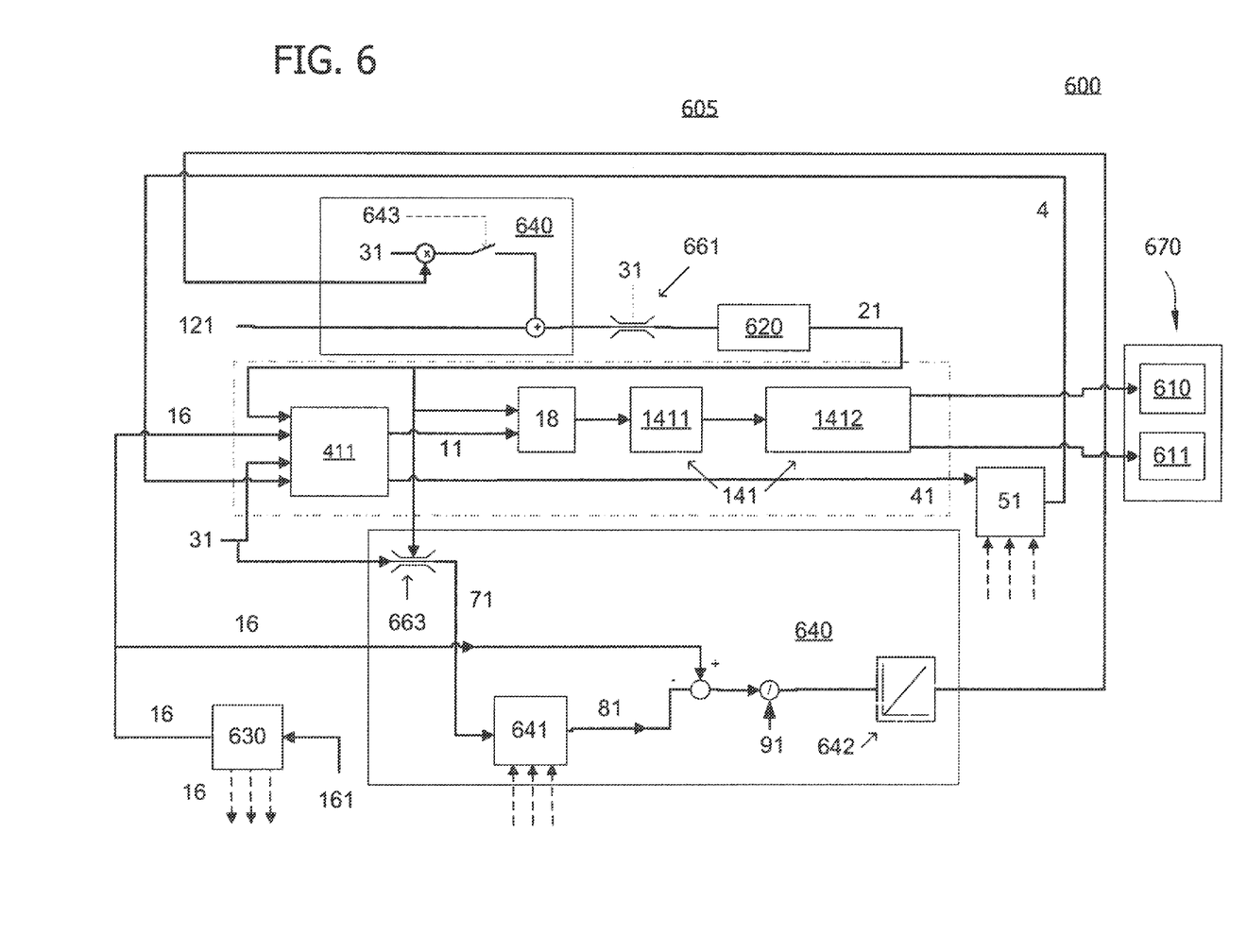
FIG. 6 is a block diagram of a wind farm including a wind farm control system according to an embodiment.

FIG. 6 shows a block diagram of a wind farm 600 including a wind farm control system 605. Wind farm 600 is divided into two or more wind turbine groups 670. For sake of clarity only one wind turbine group 670 with two exemplary wind turbines 610, 611 is shown in FIG. 6. For the same reason, only the part of the wind farm control system 605 required for controlling wind turbine group 670 is shown in FIG. 6. The not shown parts of wind farm control system 605 may interface with the shown units of wind farm control system 605 as indicated by the dashed arrows in FIG. 6.

The part of wind farm control system 605 within the dashed-dotted rectangle of FIG. 6 may substantially correspond to the part of wind farm control system 505 within the dashed-dotted octagon of FIG. 5.

In the exemplary embodiment illustrated in FIG. 6, the minimum of the group power setpoint 11 and the group curtailment setpoint 12 calculated in a block 18 is used as input to determine individual power setpoints for the wind turbines of the group 670 instead of the group power setpoint 11. Accordingly, the safety of operation is typically increased. Further, the exemplary group power distributing unit 141 of control system 605 is implemented as a group power regulator unit 141 which includes two subunits: a power regulator unit 1411 configured to determine individual power setpoints for the wind turbines 610, 611 and a power command distributing unit 1412 connected to the group power regulator unit 1411 and the wind turbines 610, 611 and configured to issue the individual power setpoints to the wind turbines 610, 611. The group power regulator unit 1411 typically controls the power production of wind turbine 610, 611 in a closed manner and may be implemented as suitable proportional integral controller. For sake of clarity, flow of information from the wind turbines 610, 611 to wind farm control system 605 such as actual power production is not shown in FIG. 6.

According to an embodiment, the group curtailment setpoint 21 is determined from an external group curtailment request 121 in a slew rate unit 620 which limits the change of the group curtailment setpoint 21 of wind turbine group 670. Accordingly, the safety of operation is typically increased. For the same reason, the input value of the slew rate unit 620 is typically limited to the rated power 31 of wind turbine group 670 using a delimiter 661.

It goes without saying that the group curtailment setpoint(s) of the one or more other wind turbine group(s) may be determined similarly.

According to an embodiment, wind farm control system 605 further includes a wind farm power regulator unit 630 which is configured to determine the power setpoint 16 for the wind farm 600 using an external power request 161, typically an external power reduction request, for the wind farm 600 as input value. Determining the power setpoint 16 typically includes limiting the slew rate of the power setpoint 16. Accordingly, the safety of operation is typically increased.

In the exemplary embodiment, wind farm control system 605 further includes an optional overproduction unit 640 which may be used to allow an overproduction above the group setpoint limitations. For sake of clarity, the overproduction unit 640 is distributed over two separated boxes 640 in FIG. 6.

A summing unit 641 is typically used to determine a sum 81 of available group power production values 71 of the wind turbine groups i. The available group power production values 71 may correspond to the power production values 31, in particular to the possible power production of the wind turbine group, or to the power production values 31 limited by the respective group curtailment setpoint 21 using a delimiter 663. The sum 81 of available group power production values may be subtracted from the power setpoint 16 and the result divided by the installed or rated power 91 of the wind farm 600 to obtain a normalized value (ranging between −1 and 1). The normalized value may be passed through a threshold filter 642 to obtain a filtered value typically ranging from zero to one. The filtered value may be multiplied with the rated power 31 of the wind turbine group 670, and the obtained result may be added to the power reduction request 121 which is thereby limited when enabled by closing a corresponding switch 643.

It goes without saying that the power reduction request for the other wind turbine groups may similarly be determined.

The wind farm control system 605 allows that curtailment setpoints can be applied individually to the wind farm and each wind turbine group. The wind farm power regulator unit 630 provides a power reference (power setpoint 16) to all groups which is used with group specific curtailment setpoints 21 for the group regulation.

The wind farm control system 605 can ensures that the group power setpoints are never exceeded. In addition it can be configured to allow an overproduction above the group setpoint limitations. In this case, the external curtailment reference 121 maybe relaxed. In conditions where some wind turbine groups fall below their curtailment setpoint (12$i$) due to a reduction in wind speed or other reasons, other wind turbine groups can provide additional power to maintain the external wind farm power request 161.

In addition, the overproduction may be prioritized. For example, switches (633) may be used to disable/enable that wind turbine groups cannot/can exceed their group setpoint limit to optimize the overall power output of the wind farm 600.

The method performed in the overproduction units 640 may be described as receiving a set of curtailment setpoints having a group curtailment setpoint 2$i$ for each of the at least two groups of wind turbines, and determining an updated set of curtailment setpoints 2$i'$ by relaxing at least one of the group curtailment setpoints to allow an overproduction of at least one of the at least two groups of wind turbines. In a next iteration step, the updated set of curtailment setpoints 2$i'$ is used as input of the subunits 41$i$ wind farm control system 605 for determining for each of the at least two groups of wind turbines a group power setpoint such that a sum of the group power setpoints substantially matches the power setpoint.

Further, the wind farm control system 605 does not require additional grid measurement devices for operating the wind farm 600 as the group power output may be controlled by the feedback of actual turbine power allocated to the wind turbine groups. As such wind farm control system 605 typically controls the group of wind turbines in a closed loop manner.

The functions of wind farm control system 605 may be realized with another topology. In the following, related methods for controlling a wind farm are explained.

Figure 7:
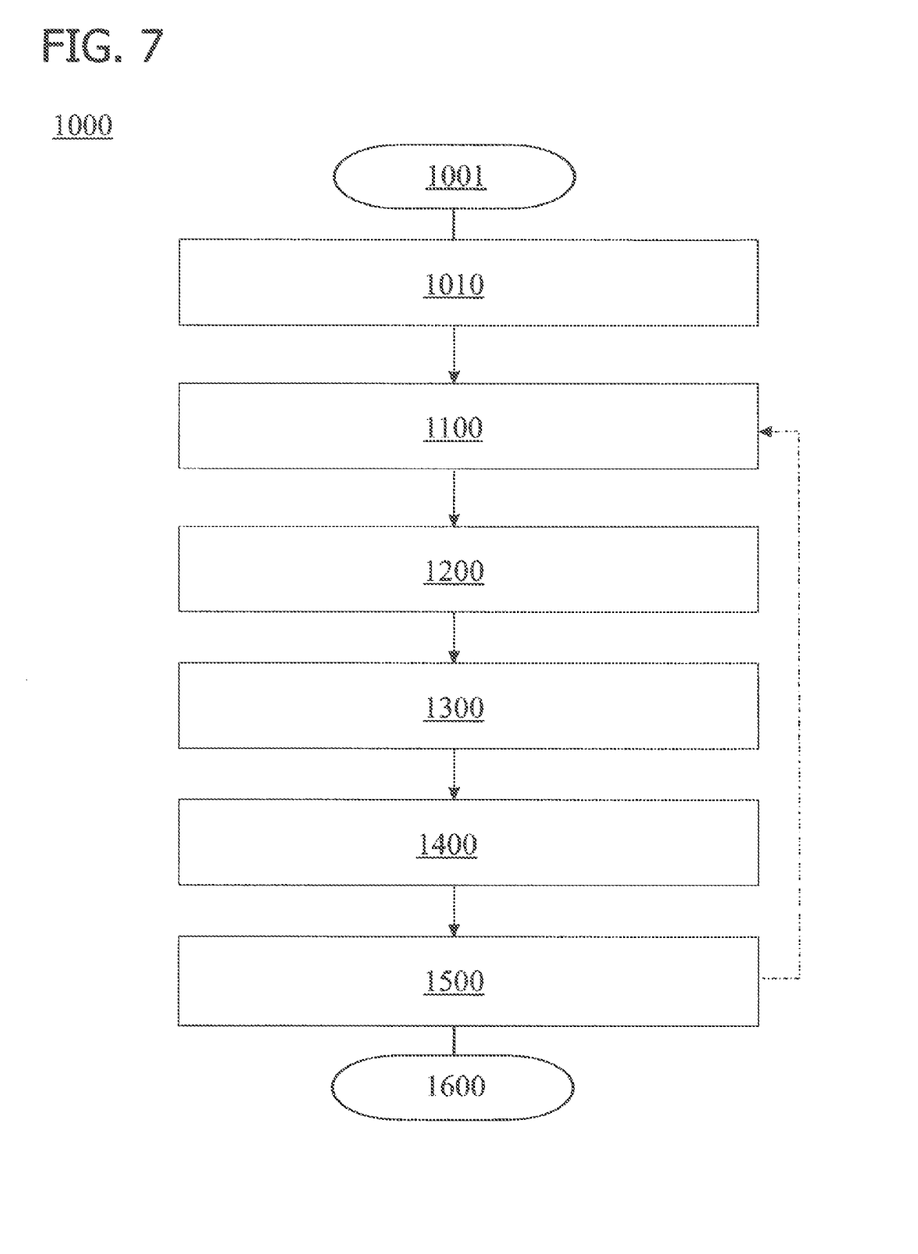
FIG. 7 illustrates a flow diagram of a method for operating a wind farm according to an embodiment.

FIG. 7 is a flow diagram of a method 1000 for operating a wind farm, for example a wind farm as explained above with regard to FIGS. 3 to 6.

After starting in block 1001, the wind turbines are clustered into disjunct wind turbine groups in a block 1010. This may be done prior to, for example prior to connecting the wind farm to a grid (offline), or during normal operation of the wind farm (online).

In a block 1100, a new power setpoint for the wind farm is determined which is lower than a rated power of the wind farm. This typically includes receiving a lower power limit or a power reduction request of a grid and/or a substation. The power limit may be higher or lower than the currently valid power setpoint. In the first event, the method may be considered as a method for curtailing the wind farm. Typically, the new power setpoint is determined in accordance with a slew rate limit.

In a block 1200, power production values are determined for each of the wind turbine groups, for example actual power productions or estimated maximum possible power productions of the wind turbine groups.

In a subsequent block 1300, group curtailment setpoints are determined for each of the wind turbine groups.

The group curtailment setpoints are typically in a range from zero to a rated power of the respective wind turbine group.

Determining the group curtailment setpoints may include taking into account power demands of one or more energy traders for respective groups of wind turbines.

According to an embodiment, one or more group curtailment setpoints may be relaxed to allow an overproduction of the corresponding wind turbine group(s). This typically includes forming a sum of available group power production values and comparing this sum with the power setpoint.

Furthermore, the group curtailment setpoints are typically limited in accordance with a group slew rate limit.

In a subsequent block 1400, new group power setpoints are determined for each of the wind turbine groups. Typically, this includes determining for each group of wind turbines a power reference value using the respective group curtailment setpoint and the respective power production value as inputs. As explained above with regard to FIG. 4 to FIG. 6, the new group power setpoints are typically determined such that they are proportional to the respective power reference values.

Typically, the group power setpoints are determined as a product of the respective power reference values and the power setpoint divided by a sum of the power reference values. The used sum of the power reference values may correspond to an actual sum the power reference value or to a sum of the power reference values determined in the preceding time step and cycle, respectively.

In a subsequent block 1500, the new group power setpoints are used to close-loop control the wind turbines in their groups.

Thereafter, the method may return to block 1100 to realize a close-loop control. Alternatively, method 1000 may be ended in a block 1600.

According to an embodiment of a method for curtailing a wind farm, the method includes dividing the wind farm into at least two groups of wind turbines so that each of the at least two groups of wind turbines comprises at least one wind turbine of the wind farm, and that each of the wind turbines of the wind farm belongs to one of the at least two groups of wind turbines, receiving a power reduction request for the wind farm, determining a power setpoint for the wind farm using the power reduction request, determining a group curtailment setpoint and an power production value for each of the at least two groups of wind turbines, determining for each of the at least two groups of wind turbines a group power setpoint such that a sum of the group power setpoints substantially matches the power setpoint, determining the group power setpoints including comparing the respective group curtailment setpoint and the respective power production value, and, operating the at least two groups of wind turbines in accordance with the respective group power setpoint.

Exemplary embodiments of systems and methods for coordinated operating the wind farm and groups of wind turbines are described above in detail. The systems and methods allow managing different power demands based e.g. on the request of the energy traders while the overall power output of the wind farm is controlled such that the utility grid may be stabilized, for example in the event of a frequency drop of the utility grid, or during a required reduction of the overall power output event which may be due to other grid issues such as substation maintenance and grid bottlenecks. Further, the groups may be prioritized.

The systems and methods are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind farm, the method comprising:
   determining a power setpoint for the wind farm;
   determining a group curtailment setpoint for each of at east two groups of wind turbines, each of the at least two groups of wind turbines comprising at least one wind turbine of the wind farm, each of the wind turbines of the wind farm belonging to one of the at least two groups of wind turbines;
   determining a power production value of each of the at least two groups of wind turbines;
   determining for each of the at least two groups of wind turbines a power reference value using the respective group curtailment setpoint and the respective power production value;
   determining for each of the at least two groups of wind turbines a group power setpoint which is proportional to the respective power reference values and determined as a product of the respective power reference value and the power setpoint divided by a sum of the power reference values; and
   operating the at least two groups of wind turbines by using the respective group power setpoints to determine individual power setpoints for the wind turbines of the at least two groups of wind turbines, wherein each of the respective group power setpoints is related to each of the respective power reference values by a uniform proportion, and
   wherein determining the group curtailment setpoint comprises at least one of considering a power demand of at least one energy trader for at least one of the at least two groups of wind turbines, relaxing at least one of a previously calculated group curtailment setpoint to allow an overproduction, or limiting a group power reduction in accordance with a group slew rate limit.

2. The method of claim 1, wherein determining the power reference value comprises determining the minimum of the respective group curtailment setpoint and the respective power production value.

3. The method of claim 1, wherein determining the power setpoint comprises at least one of receiving a power limit; and limiting a reduction of the power setpoint in accordance with a slew rate limit.

4. The method of claim 1, wherein each of the group curtailment setpoints is in a range from zero to a rated power of the respective group of the at least two groups of wind turbines; and wherein relaxing at least one of the group curtailment setpoint comprises at least one of forming a sum of available group power production values; and comparing the sum with the power setpoint.

5. The method of claim 1, further comprising dividing the wind farm into the at least two groups of wind turbines.

6. The method of claim 1, wherein the group power setpoints are determined iteratively as a product of the respective power reference values and the power setpoint divided by a sum of power reference values determined in a previous iteration step.

7. The method of claim 1, wherein the method is closed-loop controlled.

8. A method for curtailing a wind farm, the method comprising:
   dividing the wind farm into at least two groups of wind turbines so that each of the at least two groups of wind turbines comprises at least one wind turbine, and that each of the wind turbines belongs to one of the at least two groups of wind turbines;

receiving a power setpoint for the wind farm Which is lower than a rated power of the wind farm;

receiving a set of curtailment setpoints comprising, a group curtailment setpoint for each of the at least two groups of wind turbines;

determining a power production value of each of the at least two groups of wind turbines;

determining for each of the at least two groups of wind turbines a power reference value using the respective group curtailment setpoint and the respective power production value;

determining an updated set of curtailment setpoints comprising relaxing at least one of the group curtailment setpoints to allow an overproduction of at least one of the at least two groups of wind turbines; using the updated set of curtailment setpoints for determining for each of the at least two groups of wind turbines a group power setpoint such that a sum of the group power setpoints substantially matches the power setpoint; and operating the at least two groups of wind turbines by using the respective group power setpoints to determine individual power setpoints for the wind turbines of the at least two groups of wind turbines, wherein each of the respective group power setpoints is related to each of the respective power reference values by a uniform proportion.

9. The method of claim 8, further comprising:

determining a power production value for each of the at least two groups of wind turbines, wherein relaxing the at least one of the group curtailment setpoints comprises at least one of:

determining a sum of the power production values;

subtracting the sum of the power production values from the power setpoint to form a difference value; and dividing the difference value by the rated power of the wind farm.

10. The method of claim 8, wherein dividing the wind farm is performed in accordance with an ownership and/or with a contract with an energy trader.

* * * * *